May 28, 1957
M. S. JOHNSON ET AL
2,793,532
VEHICLE SPEEDOMETER DRIVE
Filed Feb. 10, 1954
2 Sheets-Sheet 1
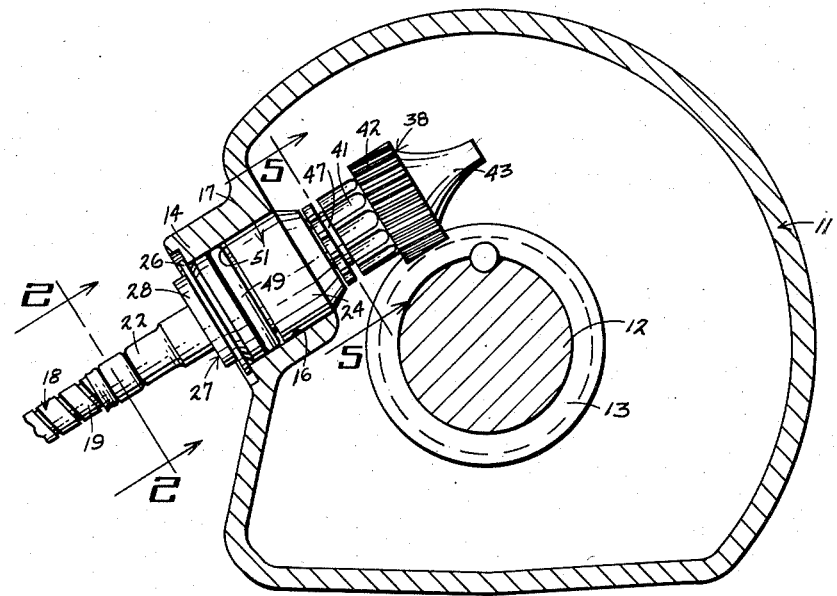
Fig.1
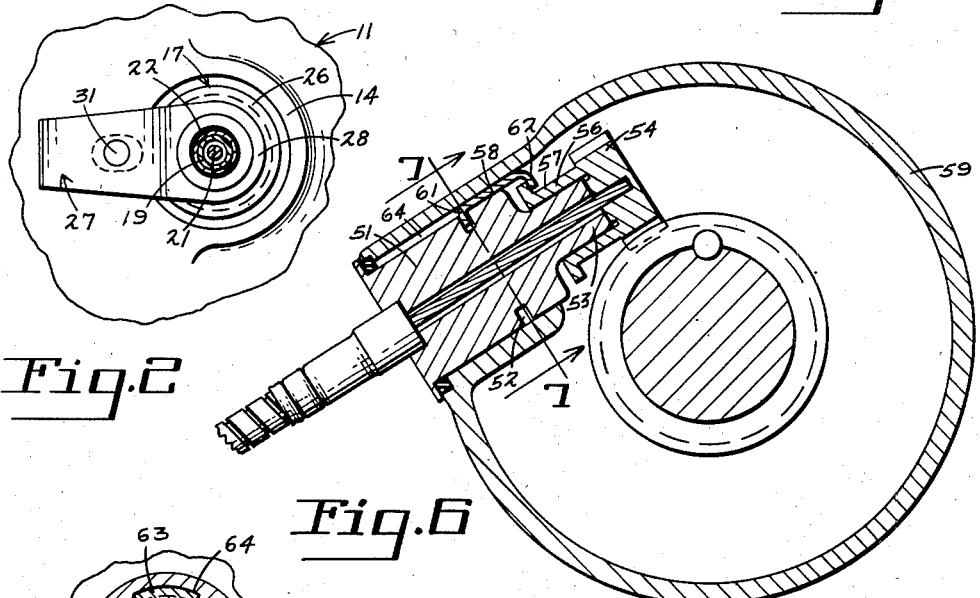
Fig.2
Fig.6
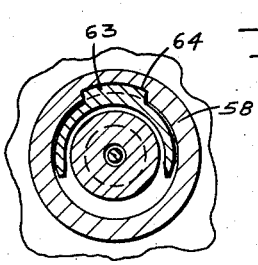
Fig.7
INVENTORS
M.S. JOHNSON.
E.A. GASSER.
BY
E.C. McRae
J.R. Faulkner
T.H. Oster
ATTORNEYS May 28, 1957 M. S. JOHNSON ET AL 2,793,532
VEHICLE SPEEDOMETER DRIVE
Filed Feb. 10, 1954 2 Sheets-Sheet 2

INVENTORS
M. S. JOHNSON,
E. A. GASSER.
BY
E.C. McRae
J.R. Faulkner
T.H. Oster ATTORNEYS United States Patent Office 2,793,532
Patented May 28, 1957

2,793,532

VEHICLE SPEEDOMETER DRIVE

Michael S. Johnson, Detroit, and Eugene A. Gasser, Dearborn, Mich., assignors to Ford Motor Company, Dearborn, Mich., a corporation of Delaware Application February 10, 1954, Serial No. 409,408

5 Claims. (Cl. 74—12)

This invention relates generally to motor vehicles, and particularly to a speedometer drive for a motor vehicle.

It is an object of the present invention to provide a vehicle speedometer drive in which the driving connection between the speedometer cable and the transmission output shaft is of improved design. This connection is formed of a minimum of economically manufactured and assembled parts, and minimizes the possibility of oil from the transmission housing entering the speedometer cable through the driving connection. The construction enables the lower end of the speedometer cable to be connected to the transmission housing in an upwardly inclined position so that the portion of the speedometer cable located exteriorly of the transmission housing may be positioned relatively low to provide adequate clearance for a low body floor panel. Conventional speedometer drive connections when placed in this upwardly inclined position might admit oil to the interior of the speedometer cable and permit it to be transmitted upwardly through the cable to the speedometer mechanism, but the construction of the present invention prevents this possibility. In the present invention, in addition, the cable end connector serves as a bearing for the speedometer driven gear and the cable is directly connected to an extension of the driven gear so as to provide a simple construction eliminating the necessity for a separate driven gear shaft.

Other objects and advantages of this invention will be made more apparent as this description proceeds, particularly when considered in connection with the accompanying drawings, wherein:

Figure 1 is a transverse cross sectional view through the rearward portion of the transmission housing and illustrating the speedometer drive mechanism of the present invention.

Figure 2 is a cross sectional view taken on the line 2—2 of Figure 1, showing in elevation the cable end connector clamp.

Figure 6 is a cross sectional view of a modified form of the invention.

Figure 7 is a cross sectional view taken on the line 7—7 of Figure 6.

Figure 3:
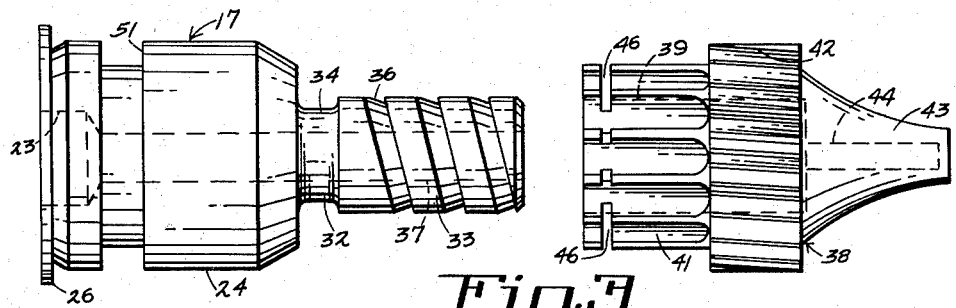
Figure 3 is an exploded elevational view illustrating the cable end connector and the speedometer driven gear.

Referring now to the drawings, and particularly to Figure 1, the reference character 11 indicates the housing of a motor vehicle transmission adjacent the rearward end thereof. The output shaft 12 of the transmission extends centrally through this portion of the transmission housing and has an externally toothed portion 13 forming a driving gear for the motor vehicle speedometer.

The transmission housing 11 is formed at one side with an embossment 14 provided with a cylindrical bore 16 therethrough. A cable end connector indicated generally by the reference character 17 extends into the bore 16 of the embossed portion 14 of the transmission housing and forms a mounting for the end of the speedometer cable 18.

The speedometer cable 18 comprises a flexible conduit 19 housing a core 21 rotatable within the conduit and projecting beyond the end of the conduit. A ferrule 22 is connected to the end of the conduit 19 and is received within a socket 23 formed in the end wall of the cable end connector 17, being soldered thereto. It will thus be seen that the cable end connector 17 is secured to the end of the conduit 19.

Figure 4:
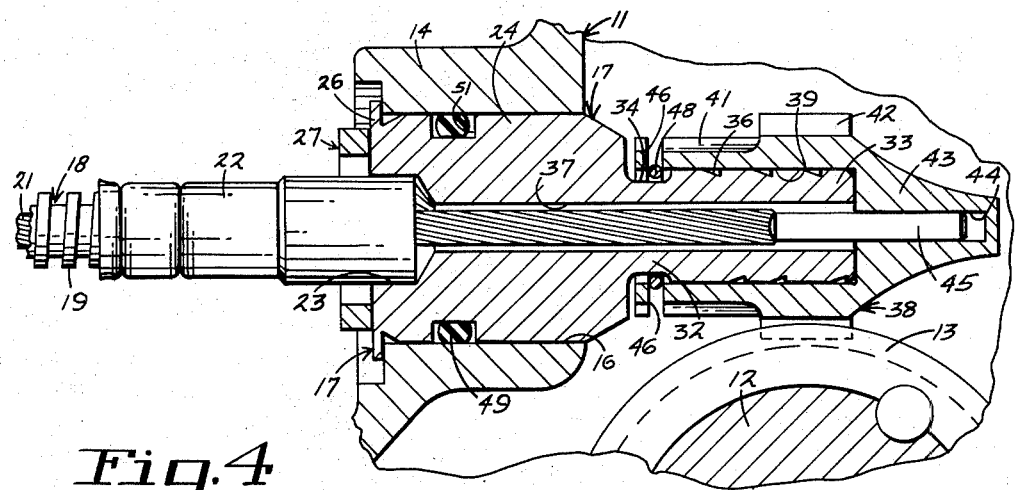
Figure 4 is an enlarged cross sectional view of a portion of the construction shown in Figure 1.

As best seen in Figures 3 and 4, the cable end connector 17 is formed with a cylindrical shank 24 corresponding in diameter to the diameter of the bore 16 formed in the transmission housing embossment 14. The end connector also has an end flange 26 abutting the outer wall of the transmission housing 11 and clamped thereto by means of a clamping strip 27. As best seen in Figures 1 and 2, the clamping strip 27 has an end ring portion 28 bearing against the end flange 26 of the cable end connector and an integral body portion 29 extending along the outer wall of the transmission housing and clamped thereto by means of a stud 31.

The cylindrical body portion 24 of the cable end connector 17 is connected by a reduced neck portion 32 to the shank portion 33 of the connector in such manner as to form a shallow annular groove 34 therebetween, for a purpose to be described more in detail hereinafter. The external surface of the shank 33 of the end connector is formed with a continuous helical groove 36 rolled or cut into the peripheral surface thereof. A bore 37 extends completely through the cable end connector 17 and is somewhat larger in diameter than the diameter of the core 21 of the cable.

The reference character 38 indicates generally the speedometer driven gear, formed preferably of nylon. The gear 38 is provided with a cylindrical bore 39 corresponding in diameter to the diameter of the shank 33 of the cable end connector 17 so as to permit the gear 38 to be sleeved over the shank of the end connector and rotatably mounted thereon.

The external surface of the end portion 41 of the driven gear 38 is fluted in a longitudinal direction to provide the requisite strength with a minimum of material. The intermediate portion of the gear 38 is formed with external teeth 42 designed to mesh with the gear teeth 13 on the transmission output shaft 12.

An integral tapered nose portion 43 is formed at the inner end of the driven gear 38, and is provided with an axially extending elongated socket 44 of square cross section. The extreme end 45 of the core 21 of the cable 18 projects beyond the inner end of the shank portion 33 of the cable end connector 17, and is of square cross sectional shape to be received within the square socket 44 formed in the nose 43 of the speedometer driven gear 38.

Figure 5:
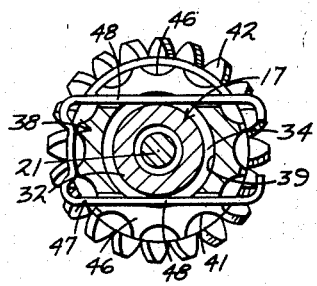
Figure 5 is a cross sectional view taken on the line 5—5 of Figure 1.

The end portion 41 of the speedometer driven gear 38, as best seen in Figures 4 and 5, is formed with chordal slots 46 extending parallel to each other on diametrically opposite sides of the fluted portion 41 of the gear. The slots 46 are deep enough to open into the bore 39 of the gear in alignment with the annular peripheral groove 34 formed on the intermediate portion of the cable end connector 17. A C-shaped wire spring retainer 47 is assembled to the fluted end portion 41 of the speedometer driven gear 38 with the elongated legs 48 of the retainer extending through the slots 46 and into the annular peripheral groove 34 formed in the end connector. It will be apparent that the wire spring retainer 47 limits relative axial movement between the speedometer driven gear 38 and the cable end connector 17. The speedometer driven gear 38 can be readily disassembled from the cable end connector 17 and the cable core 21 by springing the legs 48 of the wire spring retainer apart to permit the gear to be withdrawn from the shank 33 of the end connector. The connection between the driven gear and the end connector afforded by the wire spring retainer is necessary because of the thrust upon the driven gear tending to disengage it from the shank of the end connector when the vehicle is being driven in reverse.

It will be apparent that the construction described above protects the speedometer cable from the transmission oil and prevents the oil from being admitted into the interior of the cable. The nylon driven gear 38 is completely closed at its nose end 43 and telescopically embraces the cylindrical shank portion 33 of the cable end connector 17 so as to shield the open end of the bore 37 in the end connector from oil which may be splashed up into the upper portion of the transmission housing during the operation of the vehicle. Any oil splashed upon the nylon driven gear 38 will, by reason of the inclined position of the driven gear within the transmission housing, be drained downwardly and returned to the bottom of the housing. In addition, the helical groove 36 formed on the peripheral surface of the shank 33 of the cable end connector 17 prevents any oil from moving upwardly within the bore 39 of the driven gear 38. The helical groove 36 is a left-hand helix and consequently extends in a direction opposite to the normal direction of rotation of the driven gear 38 during forward drive. The rotation of the driven gear 38 thus tends to return any oil which may seep into the bore of the gear downwardly in the helical groove 36 into the annular groove 34 formed in the periphery of the cable end connector and thence to the bottom of the transmission housing.

A conventional O-ring seal 49 is positioned in an annular groove 51 formed on the periphery of the body portion 24 of the cable end connector 17 to form an oil seal between the connector and the transmission housing 11 and to prevent the escape of oil from the transmission housing through the bore 16.

In the modification shown in Figure 6 and 7, the cable end connector 51 is formed with a peripheral groove 52 and with a cylindrical shank 53. The nylon driven gear 54 is formed with a sleeve portion 56 rotatably supported upon the shank 53 of the end connector. The driven gear 54 is also formed with a peripheral groove 57. A spring clip 58, generally U-shaped in cross section, is supported within the transmission housing 59 and has its opposite end flanges 61 and 62 received within the peripheral grooves 52 and 57 formed in the end connector and driven gear respectively.

As best seen in Figure 7, the spring clip 58 is generally U-shaped in end elevation and is formed with an enlarged intermediate projection 63 engaging a corresponding depression or groove 64 in the interior surface of the transmission housing 59 to interlock the clip to the housing and prevent rotation of the clip about the axis of the driven gear 54.

It will be understood that the invention is not to be limited to the exact construction shown and described, but that various changes and modifications may be made without departing from the spirit and scope of the invention, as defined in the appended claims.

What is claimed is:

1. In a motor vehicle speedometer drive, a transmission housing having an opening formed in a side wall thereof, a transmission output shaft extending generally centrally through said housing and having external gear teeth thereon adjacent the opening in said housing, a cable connector projecting into said housing through the opening in the side wall thereof and extending above said output shaft in an upwardly inclined direction, said connector having an axial bore extending completely therethrough, a flexible cable having a conduit connected at its end to said cable connector and a flexible core within said conduit projecting through the axial bore in said cable connector and extending beyond the opposite end thereof, said cable connector having a cylindrical shank at its inner end, an elongated driven gear having a cylindrical bore formed therein and telescopically and rotatably engaging the cylindrical shank formed on the inner end of said cable connector, said driven gear having external teeth on its periphery engageable with the gear teeth on said output shaft, said driven gear having an integral elongated nose portion at its upper end closing the bore in said driven gear, said nose portion being formed with a socket therein nonrotatably receiving the end of the cable core projecting beyond the inner end of the cable connector to effect rotation of said cable core upon rotation of said output shaft, and a retainer forming an interlocking connection between said driven gear and said cable connector to limit relative axial movement therebetween.

2. In a motor vehicle speedometer drive, a transmission housing having an opening formed in a wall thereof, a transmission output shaft extending through said housing and having gear teeth thereon in the zone of said opening in the housing wall, a supporting member mounted upon said housing and projecting through the opening in the wall thereof into the interior of said housing adjacent the gear teeth on said output shaft and extending above said output shaft in an upwardly inclined direction, said supporting member having an opening extending therethrough and a cylindrical bearing surface adjacent its inner end, a flexible cable connected to said supporting member and having a core extending through the opening in said supporting member and projecting beyond the inner end thereof, and a driven member having an elongated sleeve portion journaled on the bearing surface of said upwardly inclined supporting member, said driven member having gear teeth formed on its outer surface engageable with the gear teeth on said output shaft and having an upper closed end portion formed with a socket therein nonrotatably receiving the projecting inner end of the core of said cable, and interlocking means between said driven member and said supporting member limiting relative axial movement therebetween.

3. The structure defined by claim 2 which is further characterized in that said supporting member comprises a cylindrical body portion received within the opening in the wall of said transmission housing and a cylindrical shank formed integrally with said body portion and of smaller diameter than said body portion and positioned adjacent the gear teeth on said output shaft, said supporting member having an annular groove formed in the periphery of its shank portion at the end of said shank portion adjacent said body portion, and said driven member comprising an elongated plastic sleeve journaled on the shank portion of said supporting member and formed at one end with a chordal slot therethrough in alignment with said annular groove formed on the periphery of the shank portion of said supporting member, and a wire spring retainer carried by said driven member and having a portion thereof projecting through the chordal slot in said driven member and extending through the annular groove on the shank of the supporting member to limit relative axial movement between the driven and supporting members.

4. The structure defined by claim 2 which is further characterized in that said supporting member projects into said transmission housing in an upwardly inclined direction with the cylindrical shank portion thereof positioned adjacent the gear teeth on said output shaft, and said driven member comprises a plastic member telescopically sleeved on the shank portion of said supporting member and rotatable thereon, said supporting member and said driven member having peripheral grooves formed thereon, the retainer forming an interlock between said supporting and driven members comprising a sheet metal clip generally U-shaped in cross section with its leg portions received within the peripheral grooves in said supporting and driven members respectively, said sheet metal spring clip having an external projection received within a depressed portion of said transmission housing to lock said spring clip against rotary displacement about the axis of said supporting and driven members.

5. The structure defined by claim 2 which is further characterized in that the cylindrical bearing surface formed at the inner end of the supporting member is provided with a helical groove therein, said helical groove being formed in the direction of forward rotation of said driven member to return downwardly oil entering the hollow sleeve portion of said driven member.

References Cited in the file of this patent

UNITED STATES PATENTS

| | | |
|---|---|---|
| 1,726,421 | Berge | Aug. 27, 1929 |
| 1,806,541 | Gustafsen | May 19, 1931 |
| 2,111,713 | Watson | Mar. 22, 1938 |
| 2,120,578 | Schulze | June 14, 1938 |
| 2,579,154 | Morrison | Dec. 18, 1951 |